United States Patent Office 3,158,210
Patented Nov. 24, 1964

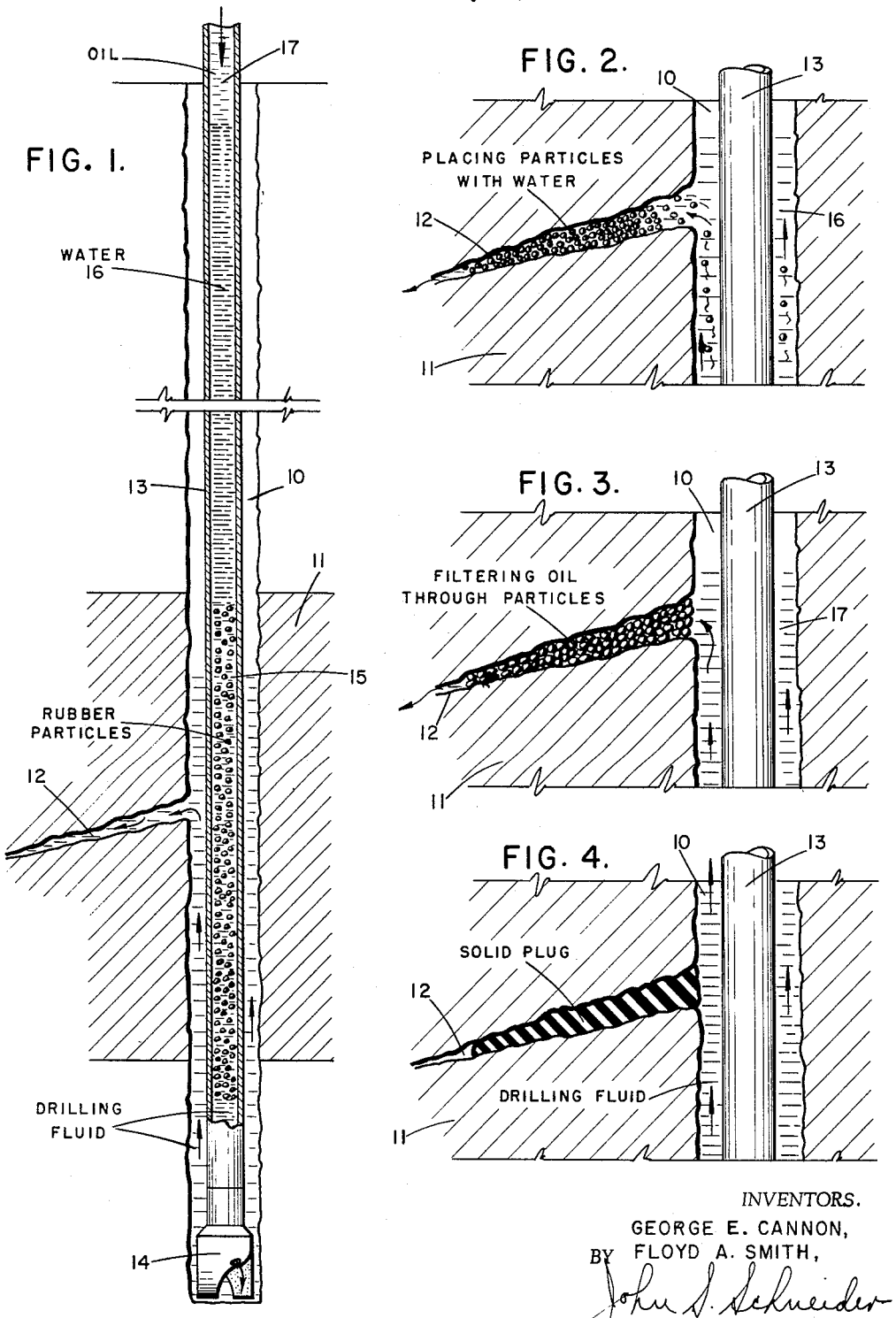

3,158,210
METHOD OF REGAINING LOST CIRCULATION
George E. Cannon and Floyd A. Smith, Houston, Tex., assignors, by mesne assignments, to Jersey Production Research Company, Tulsa, Okla., a corporation of Delaware
Filed July 20, 1962, Ser. No. 211,170
6 Claims. (Cl. 175—72)

The present invention concerns sealing zones of loss of drilling fluid in well bores in order to restore lost circulation.

In drilling wells by the rotary method, circulating drilling fluid is frequently lost, because the well bore has penetrated a highly porous formation or a cracked formation, and the circulating fluid or drilling mud that is pumped into the well bore through the rotary drill pipe enters the cracks in the cracked formation or the interstices in the porous formation and is not returned to the surface. Numerous more or less effective techniques have been used in the past to plug or bridge such zones of loss to restore drilling fluid circulation; but, nonetheless, lost circulation continues to be a major well drilling problem.

The technique of the present invention essentially comprises the use of particular lost circulation materials that effectively plug the zone of loss and regain lost drilling fluid circulation.

These materials are high molecular weight hydrocarbon polymer compositions such as polyisobutylene, cis-polybutadiene, isoprene-isobutylene (Butyl rubber), and ethylene-propylene (EPR) where the ethylene content of the EPR does not exceed 55% of the total composition, which exhibit the property of cold flow under temperature and pressure conditions encountered in oil well drilling operations.

Methods for manufacturing these compositions are described in the following publications:

(1) Polyisobutylene—Roff, W. J., Fibres, Plastics, and Rubbers, pp. 132–136. New York: Academic, 1956; and Powers, Paul O., Synthetic Resins and Rubbers, pp. 222–226. New York: Wiley, 1943.

(2) Butyl Rubber—Whitby, Synthetic Rubber, Chapter 24 entitled "Butyl Rubber." John Wiley and Sons, Inc., 1954. The polymer crumb in particular is described on page 847 of this article.

(3) Cis-Polybutadiene—W. W. Crouch and G. R. Kahle, "Take a Look at Cis-Polybutadiene," Petroleum Refiner 37, p. 187, 1958.

(4) EPR—A number of references in Chemical Abstracts, vol. 52, 1958, pp. 3730, 3394, 8699, 11,190; also, the paper "Ethylene-Propylene Copolymers Produced With Soluble Catalysts" by Kelly, Garner, Haxo, and Bingham presented at the symposium on Synthetic Elastomers from Petroleum Hydrocarbons, Division of Petroleum Chemistry, American Chemical Society, Chicago Meeting, September 3–8, 1961, pp. A–125 to A–138.

These polymers have two properties which enhance their usefulness as lost circulation materials:

(1) When granules of these polymers are brought into intimate contact, they lose their identity and form a single mass. However, this does not readily occur when the granules are in a water suspension; and (2) When the polymers are contacted by certain fluids, they swell considerably.

Briefly, the invention contemplates pumping into a well in which lost circulation is a problem a slug of the polymer in a suspension of water. This slug preferably is followed by a slug of liquid hydrocarbons such as crude oil, hexane condensate, LPG, etc., to cause the polymer to swell.

Thus, a primary object of the present invention is to provide an improved material for use in an improved technique for restoring lost drilling fluid circulation.

The above object and other objects and advantages of the invention will be apparent from a more detailed description of the invention when taken with the drawings wherein:

FIG. 1 is a schematic illustration of a well bore being drilled through a zone of lost returns;

FIG. 2 is a schematic view illustrating a step of the invention in which the polymer granules and water carrier are flowing into the zone of lost returns and the polymer granules are depositing therein;

FIG. 3 is a schematic view illustrating a step of the invention in which the polymer granules deposited in the zone of lost returns are being contacted by the swelling fluid; and FIG. 4 is a schematic view illustrating another step of the invention in which the granules have swelled until all passages between the polymer particles have plugged and a solid mass of polymer plugs the zone of loss.

For a more complete description of the invention, reference now is made to the drawings in greater detail. In FIG. 1 is shown a borehole 10 penetrating a formation 11 containing a crack or zone of loss 12. A drill string 13 provided on its lower end with a drill bit 14 contains a slug of polymer particles suspended in water 15 followed by a slug of water 16, which in turn is followed by a slug of liquid hydrocarbons 17.

FIGS. 2 to 4 show the well bore 10, formation 11, zone of loss 12, and drill pipe 13 and illustrate the sequential steps of the invention.

The operation is as follows. Referring again to FIG. 1, when drill bit 14 penetrates formation 11 and traverses the zone of loss 12, drilling fluid being circulated down drill pipe 13, through drill bit 14, and up the annulus surrounding drill pipe 13 flows into the zone of loss 12 as indicated by the arrows. The drilling fluid not lost to zone 12 flows up the annulus and is recirculated into drill pipe 13 at the earth's surface.

To plug zone of loss 12 to prevent loss of the circulating fluid, a slug of polymer particles suspended in water 15 is circulated down drill pipe 13 followed by a slug of water 16 and a slug of liquid hydrocarbons 17.

As seen in FIG. 2, the polymer particles collect in zone of loss 12, and the slug of water separating the polymer suspension and the hydrocarbon slug filters through the polymer particles which have bridged the zone of loss.

As seen in FIG. 3, the slug of liquid hydrocarbons then contacts the polymer particles, which causes them to fuse together and swell. The swelling continues until all of the passages between the polymer particles are plugged and a solid mass of polymer plugs the zone of loss, as illustrated in FIG. 4. The excess hydrocarbons then are reverse circulated out, and drilling is resumed.

Having fully described the nature, objects, advantages, and operation of our invention, we claim:

1. A method for restoring lost drilling fluid circulation when drilling a well bore in which is located a zone of circulating fluid loss comprising: pumping into said zone of loss in a water suspension a slug of a granular high molecular weight hydrocarbon composition having the property of cold flow at temperatures and pressures encountered in said well bore; and following said water suspension with a slug of liquid hydrocarbons adapted to cause said high molecular weight hydrocarbon granules to fuse together and swell to plug passages between said granules and form a solid mass of said high molecular weight composition in said zone of loss.

2. A method as recited in claim 1 in which said composition is uncured isoprene-butylene polymer.

3. A method as recited in claim 1 in which said composition is a polymer selected from the group consisting of polyisobutylene, cis-polybutadiene, isoprene-isobutylene, and ethylene-propylene.

4. A method for restoring lost drilling fluid circulation when drilling a well bore in which is located a zone of circulating fluid loss comprising: pumping into said zone of loss in a water suspension a slug of a granular high molecular weight hydrocarbon composition having the property of cold flow at temperatures and pressures encountered in said well bore; following said water suspension with a slug of water; following said slug of water with a slug of liquid hydrocarbons adapted to cause said high molecular weight hydrocarbon granules to fuse together and swell to plug passages between said granules and form a solid mass of said high molecular weight hydrocarbon composition in said zone of loss; and then reverse circulating out of said well bore the excess of said slug of liquid hydrocarbons.

5. A method as recited in claim 4 in which said composition is uncured isoprene-butylene polymer.

6. A method as recited in claim 4 in which said composition is a polymer selected from the group consisting of polyisobutylene, cis-polybutadiene, isoprene-isobutylene, and ethylene-propylene.

References Cited in the file of this patent

UNITED STATES PATENTS

| | | |
|---|---|---|
| 2,121,036 | Irons | June 21, 1938 |
| 2,812,161 | Mayhew | Nov. 5, 1957 |
| 2,854,347 | Booth et al. | Sept. 30, 1958 |
| 3,001,583 | Nevins et al. | Sept. 26, 1961 |